US005841782A

United States Patent [19]

Mock et al.

[11] Patent Number: 5,841,782

[45] Date of Patent: Nov. 24, 1998

[54] SYSTEM AND METHOD FOR INDICATING ERRORED MESSAGES

[75] Inventors: Von Alan Mock, Boynton Beach; Ronald Hugh Evoy, West Palm Beach, both of Fla.

[73] Assignee: Motorola, Inc., Schaumburg, Ill.

[21] Appl. No.: 518,042

[22] Filed: Aug. 22, 1995

[51] Int. Cl.[6] .......... G06F 11/00

[52] U.S. Cl. .......... 371/5.1

[58] Field of Search .......... 371/5.1, 38.1, 371/39.1, 48, 37.1, 5.5, 37.4; 395/185.01, 185.02; 455/33.1, 164.1

[56] References Cited

U.S. PATENT DOCUMENTS

| | | | |
|---|---|---|---|
| 4,618,955 | 10/1986 | Sharpe et al. | 371/38.1 |
| 5,247,701 | 9/1993 | Comroe et al. | 455/33.4 |
| 5,386,589 | 1/1995 | Kanai | 455/33.1 |

*Primary Examiner*—Phung M. Chung
*Attorney, Agent, or Firm*—Keith A. Chanroo

[57] ABSTRACT

A selective call receiving device (14) and method distinguishes between received message words with no errors and received message words with correctable errors so as to display a corrected message word with a predetermined number of correctable errors to a user while advising the user that the corrected word may be false or in error.

6 Claims, 3 Drawing Sheets

SYSTEM AND METHOD FOR INDICATING ERRORED MESSAGES

FIELD OF INVENTION

The present invention is directed to a selective call receiving device and more particularly to a selective call receiving device that indicates to a user whether it is likely that a received message word has been corrected to a wrong message word.

BACKGROUND OF THE INVENTION

Known selective call receiving devices, such as a pager, receive coded word transmissions from a paging network or the like. Each coded word transmission typically includes one or more coded message words where each coded message word represents one or more alphanumeric characters that can be decoded and then displayed to a user of the selective call receiving device. It is not uncommon for errors to occur in a coded word transmission due to electromagnetic interference. Selective call receiving devices respond to errored coded word transmissions in a number of different ways. For example, in one known pager, if any of the message words of an incoming transmission are uncorrectable the user will not be alerted to the incoming transmission. In another known pager, the user is alerted to all incoming coded word transmissions whether or not they include an uncorrectable message word. However, correctable message words are displayed in the usual fashion (such as solid alphanumeric characters); whereas any uncorrectable message word is not displayed but in its place an error indication such as a string of "E"s or a string of "*"s is displayed. In this pager, no distinction is made between message words with no errors and message words with a number of correctable errors.

Further in known pagers, no distinction is typically made between message words received when the signal quality of the coded word transmission is good and those received when the signal quality is poor.

SUMMARY OF THE INVENTION

In accordance with the present invention, the disadvantages of prior selective call receiving devices have been overcome. The selective call receiving device of the present invention distinguishes between received message words with no errors and received message words with correctable errors so as to display a corrected message word to a user while advising the user that the corrected word may be false or in error. More particularly the selective call receiving device of the present invention corrects errors detected in a received coded word transmission. The number of errors in a given message word is compared to a predetermined error threshold. If the number of errors is greater than or equal to the error threshold, the message word and an error indication are displayed.

These and other objects, advantages and novel features of the present invention, as well as details of an illustrative embodiment thereof, will be more fully understood from the following description and from the drawings.

DESCRIPTION OF THE PREFERRED EMBODIMENT

Figure 1:
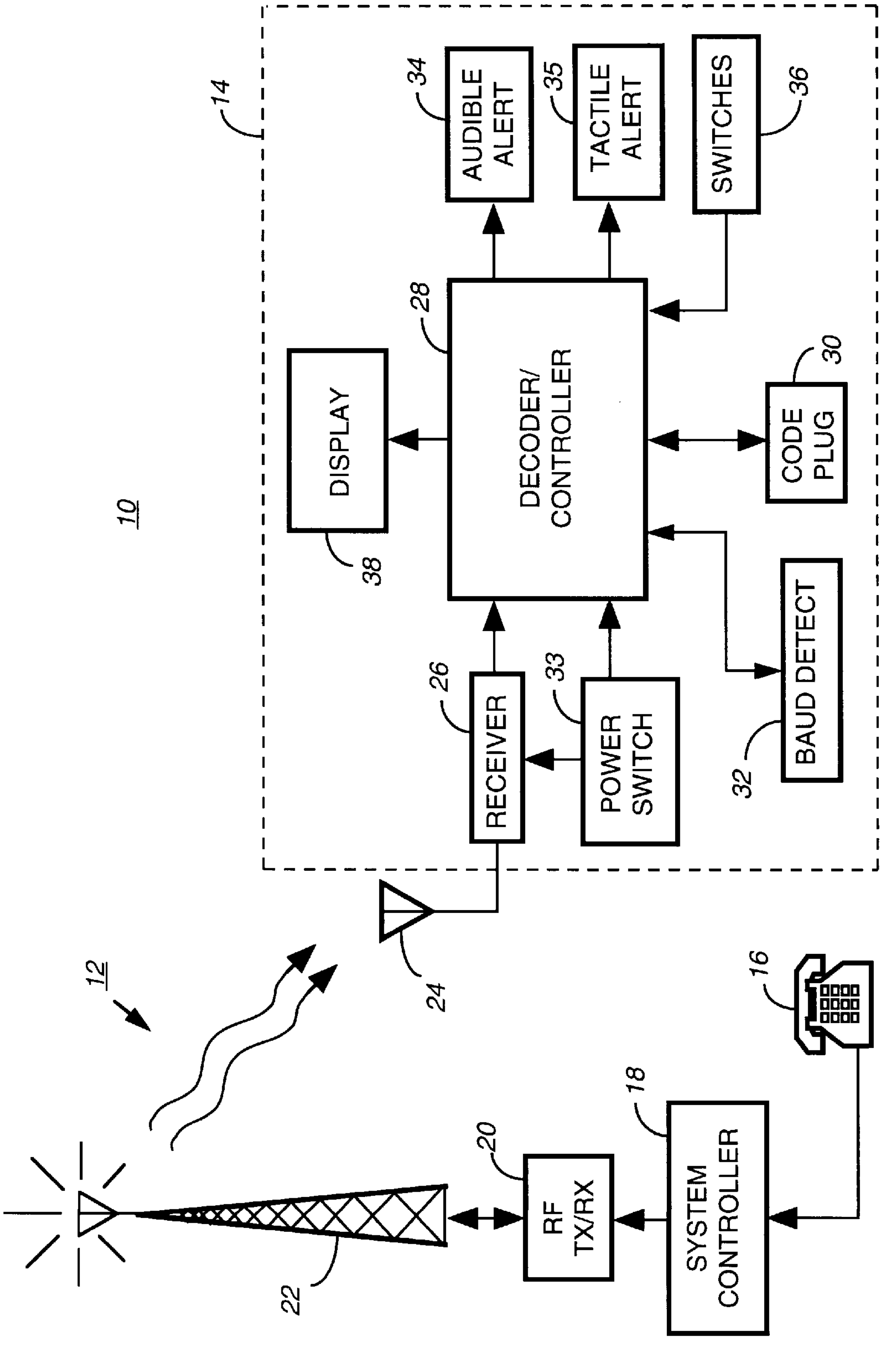
FIG. 1 is a block diagram of a paging system including a transmitter and a selective call receiving device in accordance with the present invention.

A paging system 10, as shown in FIG. 1, includes a paging network 12 for transmitting radio frequency (RF) signals representing coded word transmissions to a selective call receiving device 14 such as a pager. The coded word transmission of the signal includes, for example, one or more coded address words identifying a particular selective call receiving device 14 as well as one or more coded message words where each coded message word represents one or more alphanumeric characters. The paging network 12 includes an input device, such as a telephone 16, for initiating pages and inputting messages to the network 12. A paging controller 18 generates coded word transmissions in accordance with a particular signaling protocol such as the POCSAG (Post Office Code Standardization Advisory Group) protocol. The paging controller 18 is coupled to a RF transmitter/receiver 20 that converts the coded word transmission to an RF signal and transmits the RF signal via an antenna 22.

The transmitted RF signal is received by the selective call receiving device 14 via an antenna 24 that is coupled to a receiver 26. The receiver 26 processes the received RF signal to produce a demodulated data stream that represents the coded word transmission. A baud detector 32 is used to detect the baud rate of the received coded word transmission. A power switch 33 is used to control the supply of power to the receiver 26. The demodulated data stream is then sent to the decoder/controller 28 for decoding the data stream into symbols such as 0, 1 for a two-level signal or 00, 01, 10 and 11 for a four-level signal. The resulting symbols, groups of which form address and message words are then corrected for any transmission errors.

The decoder/controller 28 may correct received message words using any one of a number of known error correcting techniques such as random error correction or burst error correction. One suitable random error correction scheme is disclosed in U.S. Pat. No. 5,051,999, incorporated herein by reference. This scheme is capable of correcting a number of signaling protocols including a POCSAG (Post Office Code Standardization Advisory Group) code. POCSAG uses address and message words comprising 32 binary bits. Of the 32 bits, 21 are information bits and the remaining bits are parity bits. POCSAG allows correction of a maximum of 2 randomly spaced errors or 2-bit random error correction. The relationship of the maximum number of correctable random errors to the total number of bits and parity bits in a coded word is described in "Principles of Communication Systems", 2nd ed., Herbert Taub and Donald L. Shilling, McGraw-Hill Book Company, 1986, pages 555–556.

Burst error correction corrects errors in a coded word when the errors are consecutive or in bursts rather than spaced randomly throughout the coded word. The maximum number of correctable burst errors is usually greater than the maximum number of correctable random errors. Theoretically, the maximum number of correctable burst errors is equal to the number of parity bits in the coded word. However, practically the maximum number of correctable burst errors is limited by the correcting algorithm being used and the processing speed of the selective call receiving device 14. For example, the decoder/controller 28 might employ the process used in known selective call receivers which are capable of correcting a maximum of 4 consecutive errored bits or 4-bit burst error correction.

In a selective call receiver having 2-bit random and 4-bit burst correction capabilities, a coded message word having more than 2 random errors or more than 4 consecutive errors is uncorrectable. It should be noted that as the number of errors being corrected increases, the probability that the coded message word is being corrected to a wrong message word increases. This problem is commonly referred to as "falsing". Another factor which is recognized herein as effecting the probability of correcting to a wrong message word is signal quality or signal strength of the incoming coded word transmission. As the signal quality increases, the probability of correcting to a wrong message word decreases.

After decoding and correcting the demodulated data stream to obtain the address information contained therein, the decoder/controller 28 compares the received address to one or more addresses stored in a code-plug (or code memory) 30 for the particular selective call receiving device 14 to determine whether the received coded word transmission was intended for the device 14. If a match is not detected, the remainder of the coded word transmission will be ignored. However, if a match is detected, the decoder/controller 28 will continue to process the remaining coded word transmission including the coded message words contained therein.

Figure 2:
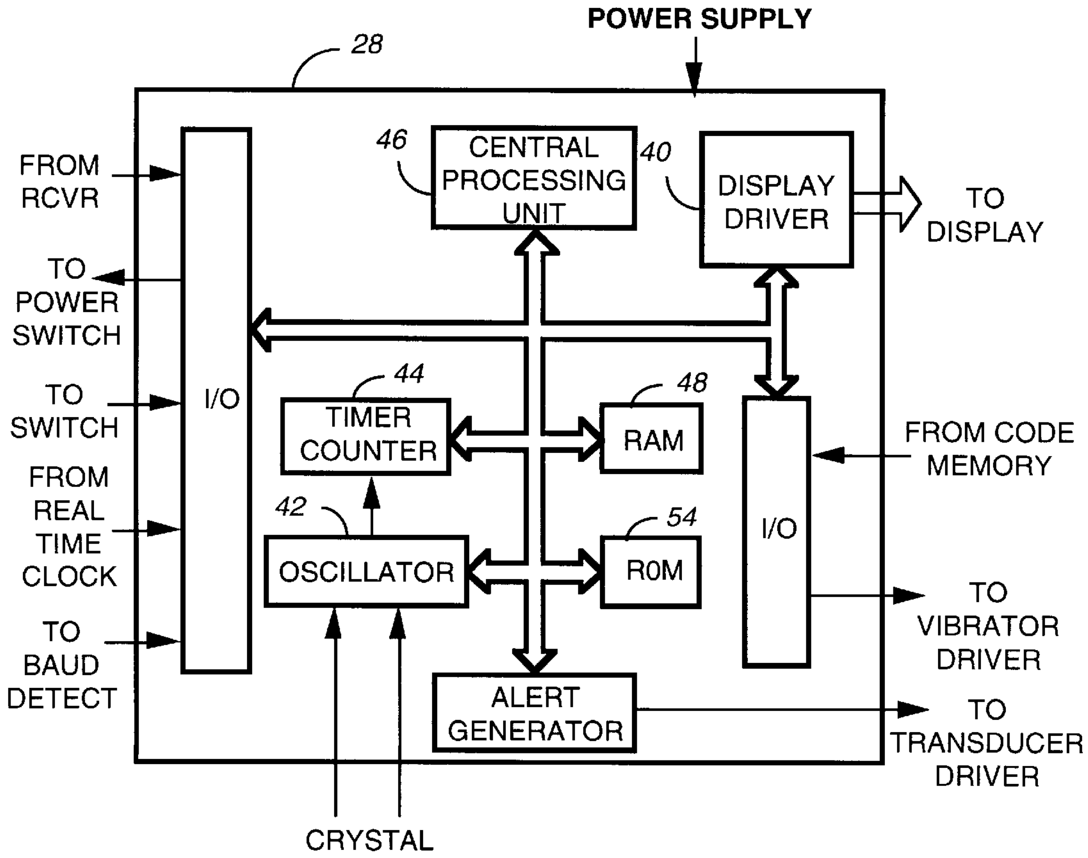
FIG. 2 is a block diagram of a decoder/controller of the selective call receiving device of FIG. 1.

The decoder/controller 28 stores the demodulated data stream in a RAM (random access memory) 48 (shown in FIG. 2). In response to a determination that the received coded word transmission was intended for the device 14, the coded message words are then processed by the software routine shown in FIG. 3. This routine determines whether a user of the device 14 should be alerted to the coded word transmission. If so, the decoder/controller 28 generates an alert signal which is directed to an audible alert 34 for generating an audible alert or to a tactile alert 35 for generating a silent vibrating alert. The decoder/controller 28 also prepares the coded message words for display and stores them in RAM 48 with a flag indicating in what manner they are to be displayed. The manner of display of a particular message word depends upon the number of errors which have been detected in that message word. When the number of errors is greater than the maximum number of correctable errors, an error indication will be displayed in the place of that message word. When the number of errors is less than a predetermined error threshold the message word will be displayed as the alphanumeric characters that the message word represents. When the number of errors in the message word is greater than or equal to the predetermined error threshold but less than or equal to the maximum number of correctable errors, the alphanumeric characters that the message word represents and an error indication will be displayed.

The message words that are stored in the RAM 48 can be accessed by the user for display using one or more of the keys or switches 36. Specifically, by selecting a read function via actuation of a switch 36, the message words are retrieved from the RAM 48 and processed by the decoder/controller 28 for display on a display 38 which may be an LCD (liquid crystal display) or the like.

FIG. 2 illustrates a controller/decoder 28 which includes a CPU (central processing unit) 46. The CPU 46 controls the response of the selective call receiving device 14 to received coded word transmissions in accordance with software routines stored in a ROM (read only memory) 54 as well as information stored in the RAM 48. It is noted that the ROM 54 may be, for example, a PROM (programmable read only memory), an EEPROM (electrically erasable programmable read only memory) or any other non-volatile storage device. The RAM 48 is utilized to store variables derived during processing, as well as message words before and after correction as described above. The decoder/controller 28 includes a display driver 40 coupled to the CPU 46 and display 38 for driving the display 38. An oscillator 42 generates timing signals that are coupled to a timer/counter 44. The timer/counter 44 provides a programmable timing function that is utilized in controlling the operation of the receiver 26 and/or the CPU 46 in a manner well known in the art.

Figure 3:
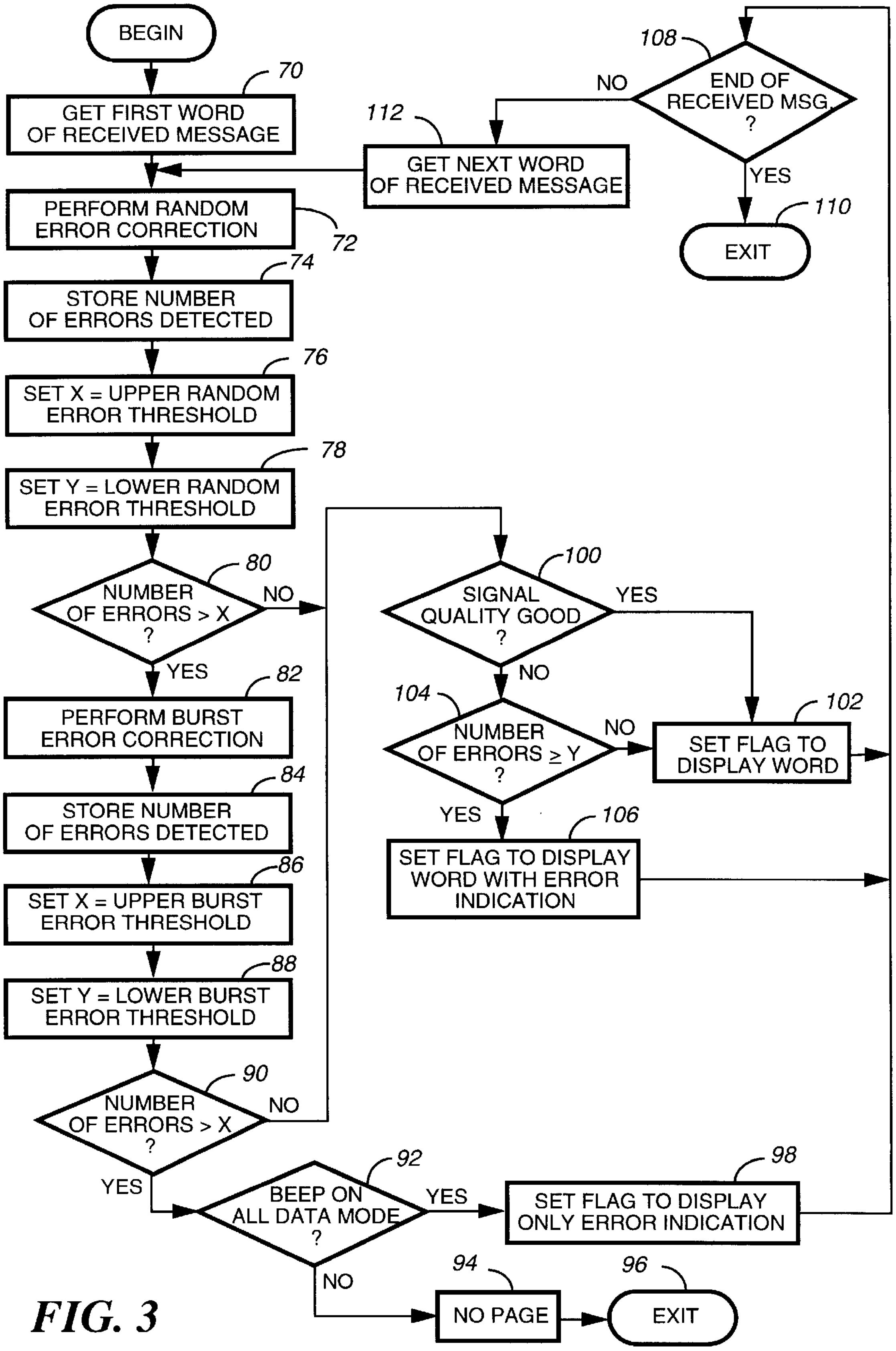
FIG. 3 is a flow chart illustrating a software routine in accordance with the present invention for controlling the display of error indications.

The software routine shown in FIG. 3 is executed by the CPU 46 to control the manner in which received message words will be displayed. In accordance with this routine, the CPU 46 at block 70 retrieves the first message word of the received coded word transmission from the RAM 48. At block 72 the CPU 46 corrects the retrieved word using random error correction while keeping track of the number of errors, if any, in the word. Thereafter at block 74, the CPU 46 stores the number of errors in the word in RAM 48. The CPU 46, at block 76, then sets a variable X equal to an upper random error threshold which could be, for example, the maximum number of correctable random errors that the particular signaling protocol and correction process employed allow. The upper random error threshold and other error thresholds mentioned below might be stored in RAM 48, ROM 54, or other memory locations in the device 14 or they may be derived by a subroutine which recognizes the particular signalling protocol being used in a manner known in the art. For 2-bit random error correction the upper random error threshold could be the number 2. At block 78, the CPU 46 sets a variable Y equal to a lower random error threshold. For 2-bit random error correction capability, this lower threshold may be equal to 1. Then at block 80 the CPU 46 determines whether the number of errors stored at block 74 is greater than X. If not, the word is displayed as described below with reference to blocks 100, 102, 104 and 106. If the number of errors is greater than X, the word is uncorrectable by random error correction and at block 82 the CPU 46 performs burst error correction. Thereafter at block 84, the CPU 46 stores in RAM 48 the number of errors detected in the word during the burst error correction. The CPU 46, at block 86, then sets the variable X equal to an upper burst error threshold which could be, for example, the maximum number of correctable burst errors that the particular signaling protocol and correction process employed allow. For 4-bit burst error correction capability the upper burst error threshold could be the number 4. At block 88, the CPU 46 sets the variable Y equal to a lower burst error threshold. For 4-bit burst error correction capability, this lower threshold may be equal to 1. Then at block 90 the CPU 46 determines whether the number of errors stored at block 84 is greater than X. If not, the word is displayed as described below with reference to blocks 100, 102, 104 and 106. If the number of errors is greater than X, the word is uncorrectable by burst error correction and at block 92 the CPU 46 determines if the selective call receiving device 14 is operating in a beep on all data mode. If not, at block 94 the user is not alerted of the incoming page information and the software routine is exited at block 96. If the selective call receiving device 14 is operating in a beep on all data mode, at block 98 the CPU 46 sets a flag associated with the word being processed to display only an error indication in the place of the word.

If at block 80 or block 90, the number of errors in the word is less than or equal to X, the CPU 46 then at block 100 determines whether the signal quality is good. This determination could be made by comparing a signal quality factor to a predetermined signal quality threshold. The signal quality factor which is measured and compared could be, for example, signal strength or magnitude or another signal characteristic indicative of the quality of the signal. If the signal quality is good, at block 102 the CPU 46 sets a flag associated with the word being processed to display only the word. If the signal quality is poor and the determination was that the word was correctable by random error correction (no) at block 80, at block 104 the CPU 46 determines whether the number of errors stored at block 74 is greater than or equal to the variable Y which is set to the lower random error threshold at block 78 as described above. If the signal quality is poor and the determination was that the word was correctable by burst error correction (no) at block 90, at block 104 the CPU 46 determines whether the number of errors stored at block 84 is greater than or equal to the variable Y which is set to the lower burst error threshold at block 88 as described above. If the number of errors is not greater than or equal to Y, at block 102 the CPU 46 sets a flag associated with the word being processed to display the word. If the number of errors is less than Y, at block 106 the CPU 46 sets a flag associated with the word being processed to display the word and an error indication (described below in greater detail with reference to FIGS. 4*a,* 4*b,* and 5).

After the CPU 46 sets a flag at either block 98, block 102 or block 106, at block 108 the CPU 46 determines if all of the message words from the received coded word transmission have been processed. If so, the software routine is exited at block 110. If not, at block 112 the CPU 46 gets the next message word of the received coded word transmission from RAM 48 and returns to block 72 to process the next message word in the same manner as described above.

Figure 4A:
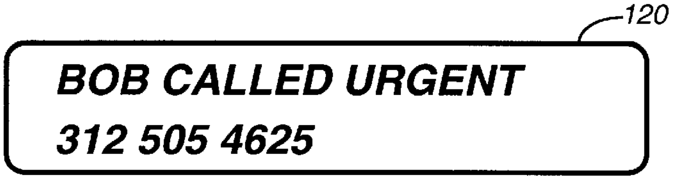
FIG. 4*a* is an illustration of a displayed message containing several message words.
Figure 4B:
FIG. 4*b* is an illustration of a displayed message containing several message words one of which has an error indication.

Corrected message words that had a number of errors greater than or equal to the lower (random or burst) error threshold could be displayed as shown in FIGS. 4*a* and 4*b* in alternating sequence. In FIG. 4*a* several message words are displayed on a display 120 including the message word represented by "4625" which contained a number of errors greater than or equal to the lower (burst or random) error threshold. The characters shown on the display 120 would alternate at a short time interval between those shown in FIG. 4*a* and those shown in FIG. 4*b*. As shown in FIG. 4*a* the corrected word is displayed and then, as shown in FIG. 4*b,* an error indication is displayed in the place of the corrected word.

Figure 5:
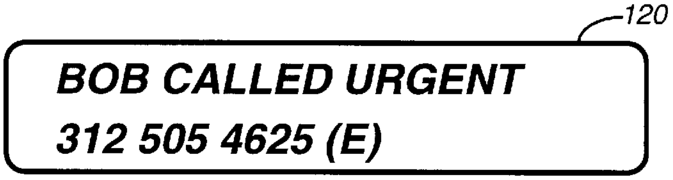
FIG. 5 is an illustration of a displayed message containing several message words one of which is displayed with an alternative error indication.

An alternative manner of displaying corrected message words that had a number of errors greater than or equal to the lower error threshold is shown in FIG. 5. Here, the corrected word is displayed on display 120 simultaneously with an error indication. The error indication could be displayed next to the corrected word containing a high number of errors as shown to allow the user to determine which words have a high error content. Alternatively an error indication could be displayed generally (not necessarily next to or near the display of the corrected word or words containing a high number of errors) when one or more words in a received coded word transmission had a high error content. Other manners of displaying the corrected words that allow a user to determine that a particular displayed word or at least one word in the displayed message had an error content greater than or equal to a lower error threshold could also be used.

Many modifications and variations of the present invention are possible in light of the above teachings. For example, the selective call receiving device 14 might only use one type of error correction, or it might use other types of error correction known in the art. Also the determination of signal quality could be eliminated. Thus, it is to be understood that within the scope of the appended claims, the invention may be practiced otherwise than as described above.

What is claimed is:

1. A selective call receiver, comprising:

a receiver for receiving a coded word transmission containing at least one message word;

a memory for storing a first predetermined error threshold and a second predetermined error threshold;

a display for displaying information to a user; and a processing system for correcting errors in a received message word to provide a corrected received message word, the processing system determining the number of errors in the received message word, comparing the number of errors to the first error threshold and to the second error threshold and controlling the display to display the corrected received message word and an error indication if the number of errors is greater than or equal to the first error threshold but less than or equal to the second error threshold.

2. A selective call receiver as recited in claim 1 further comprising means for determining a signal quality factor associated with the received coded word transmission wherein the memory stores a predetermined signal quality threshold value and the processing system compares the signal quality factor to the signal quality threshold value and controls the display to display only the corrected received message word regardless of whether the number of errors is greater than or equal to the first error threshold when the signal quality factor exceeds the signal quality threshold value.

3. A selective call receiver as recited in claim 1 wherein the processing system corrects the received message word using random error correction.

4. A selective call receiver as recited in claim 1 wherein the processing system corrects the received message word using burst error correction.

5. A selective call receiver as recited in claim 1 wherein the processing system corrects the received message word using random error correction and burst error correction and the first and second error threshold values stored in the memory are random error threshold values when random error correction produces a corrected received message word and the first and second error threshold values are burst error threshold values when burst error correction produces a corrected received message word.

6. A selective call receiver as recited in claim 5 wherein the random error threshold values are different than the burst error threshold values.

* * * * *